United States Patent
Smithea

[11] 3,940,166
[45] Feb. 24, 1976

[54] AUXILIARY RETENTION BELT AND SUPPORT CUSHION FOR SEAT OF OPEN VEHICLES

[76] Inventor: Clarence O. Smithea, Suite 302, 1911 Jefferson Davis Highway, Arlington, Va. 22202

[22] Filed: Sept. 10, 1974

[21] Appl. No.: 504,744

[52] U.S. Cl. ......... 280/290; 180/82 R; 280/150 SB; 297/4; 297/229; 297/284
[51] Int. Cl.² ......................................... B60R 21/10
[58] Field of Search .. 280/289, 290, 150 SB, 150 B; 297/4, 243, 250, 284, 285, 219, 229; 180/82 R

[56] References Cited
UNITED STATES PATENTS

| | | | |
|---|---|---|---|
| 2,854,248 | 9/1958 | Stocker | 280/150 SB |
| 2,865,433 | 12/1958 | Warner | 297/250 |
| 2,960,180 | 11/1960 | Wachtel | 297/385 X |
| 3,093,407 | 6/1963 | Wilson | 297/4 |
| 3,480,325 | 11/1969 | Kramer | 297/385 |
| 3,564,616 | 2/1971 | Battaglia | 297/385 X |
| 3,746,392 | 7/1973 | German | 297/243 X |

FOREIGN PATENTS OR APPLICATIONS

| | | | |
|---|---|---|---|
| 258,497 | 11/1948 | Switzerland | 280/290 |
| 74,629 | 12/1960 | France | 297/4 |
| 85,645 | 6/1957 | Netherlands | 280/290 |

Primary Examiner—Robert R. Song
Assistant Examiner—John P. Silverstrim

[57] ABSTRACT

This invention relates to auxiliary seat and back cushion means with safety belt for protective retention of a passenger riding behind the operator of an open vehicle such as a motorcycle wherein the operator rides astride the seat and the passenger, riding behind the operator, is retained upon the vehicle by fastening means encompassing the passenger and the operator; and wherein a back cushion is provided for support of the passenger in upright position.

5 Claims, 7 Drawing Figures

AUXILIARY RETENTION BELT AND SUPPORT CUSHION FOR SEAT OF OPEN VEHICLES

This invention relates to a seat and back support cushion releasably attachable upon the seat of an open vehicle such as a motorcycle wherein the operator is seated astride the said vehicle, and a detachable belt for the encompassment of said back support cushion, the operator of the vehicle, and a passenger, for example, a small child, seated between said back support cushion and said operator.

The teachings herein are directed to and discussed in connection with motorcycles of the type having enlarged seats of a generally elliptical contour and being substantially horizontal throughout their entire length along the axis of the vehicle.

The operator of a motorcycle maintains his position by his secure grip on the steering handlebars and by the positioning of his feet on the speed and brake controls.

Frequently, however, a passenger rides on the vehicle and his seat directly behind the operator must be maintained by his grip on a transverse strap fitted closely over the cushion at substantially the mid-point thereof. When the passenger is a child, there is no assurance that he will give close attention to the necessity of holding the cross-strap. As an alternative, he may put his arms around the body of the operator, but here again, there is the danger that he will not remember to hold tightly, or that his small arms may not reach all the way around a stoutly built body and thus may not give the child a secure hold.

The present invention provides a seat member which is doubly secured in place upon the vehicle seat, by having a portion secured beneath the transverse strap and a forward end which extends to the area upon which the operator is seated.

The seat member is further secured against slippage by the provision of fastening means which retain said seat member in fixed position beneath said transverse strap. Such means may consist of one or preferably two minor straps, each integrally attached at one end to the seat member and being of such length as to enclose said transverse strap and retain the same by fastening means such as a snap button securing the other end of said minor strap to said seat member.

As an alternative method for securing the seat member upon the vehicle seat, there may be provided an apron-like sheet affixed in lateral attachment upon the seat member and having the apron extend rearwardly upon the seat member at substantially the midpoint thereof, with the transverse strap disposed between said seat member and said apron.

In a rearward continuation of the portion of the device resting upon the vehicle seat, there is provided a cushion through the opposite sides of which a strap, such as a conventional seat belt or any belt-like member closable by a spring or snap fastener, a buckle, or other means, may be inserted, said strap then being passed around the bodies of the passenger and the operator and being fastened in front of the operator so that the passenger's hands cannot reach it to disconnect the fastening means.

When a passenger, and particularly a child, is so secured within the encompassing belt and is supported by the cushion at his back, he is protected against the hazard of falling off or being jolted off the vehicle in the event of a sharp turn or a bump in the road.

For a better understanding of the invention, reference is made to the accompanying drawings, wherein -

FIG. 1 is a perspective view of the invention installed on the seat of a motorcycle;

FIG. 2 is a side view of an operator and a small child mounted on a vehicle having the product of this invention attached thereon and around the bodies of the operator and passenger; and FIG. 3 is a perspective view showing the rear of the cushion and the supporting belt around the bodies of the operator and passenger. In this Figure the child's hand is raised, indicating his freedom from the necessity of holding onto either the strap or the operator's body.

In FIG. 4 the invention is shown in storage position secured upon the seat of the vehicle to the rear of the operator, when not in use.

Figure 1:
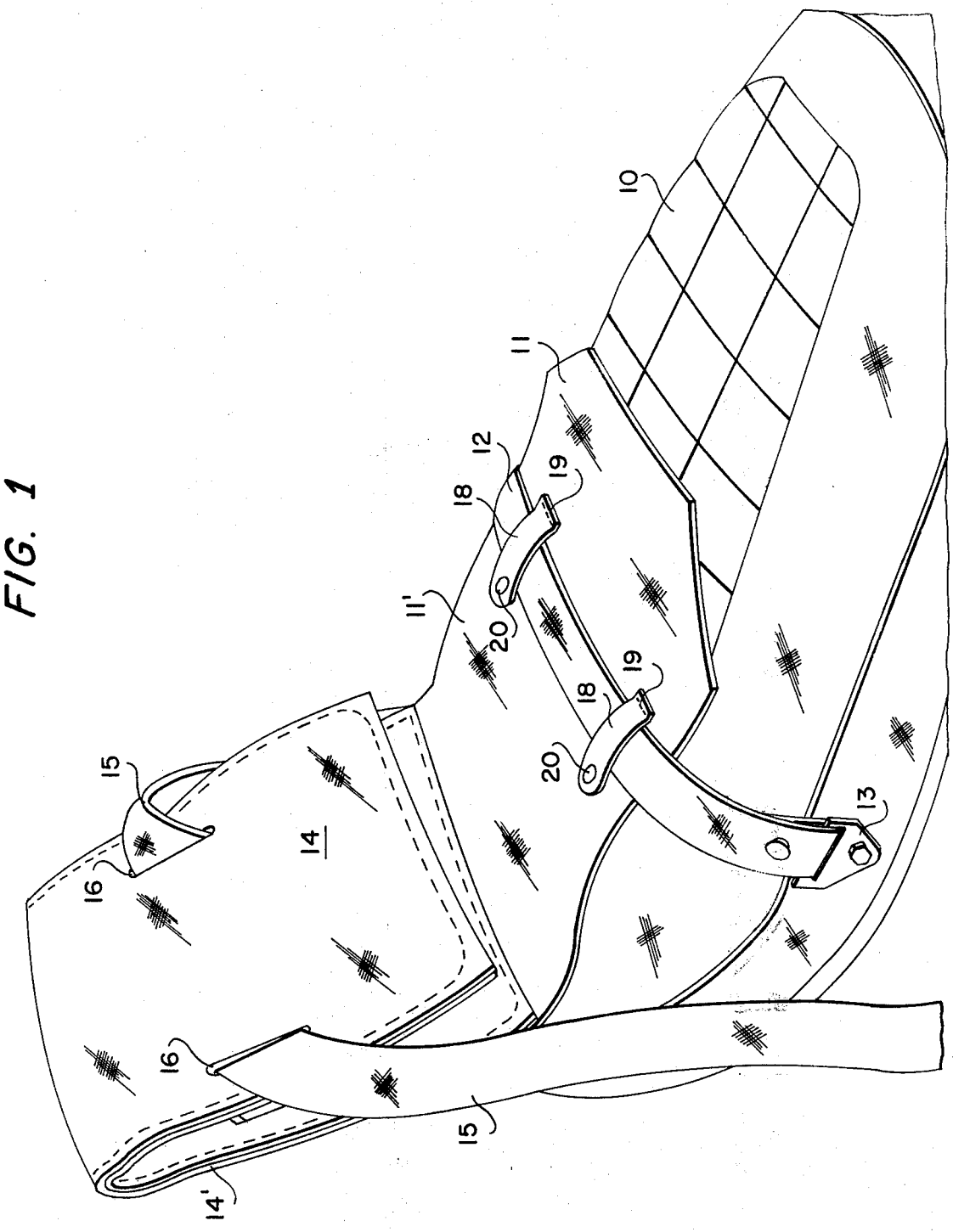

Referring more particularly to the drawings,

FIG. 1 shows the conventional type of seat 10 installed on a vehicle such as a motorcycle, with forward extension sheet 11 of the invention secured beneath transverse strap 12. Said transverse strap is integrally attached to the cushion by means 13, as shown in FIG. 1 and more clearly in FIG. 4.

Figure 2:
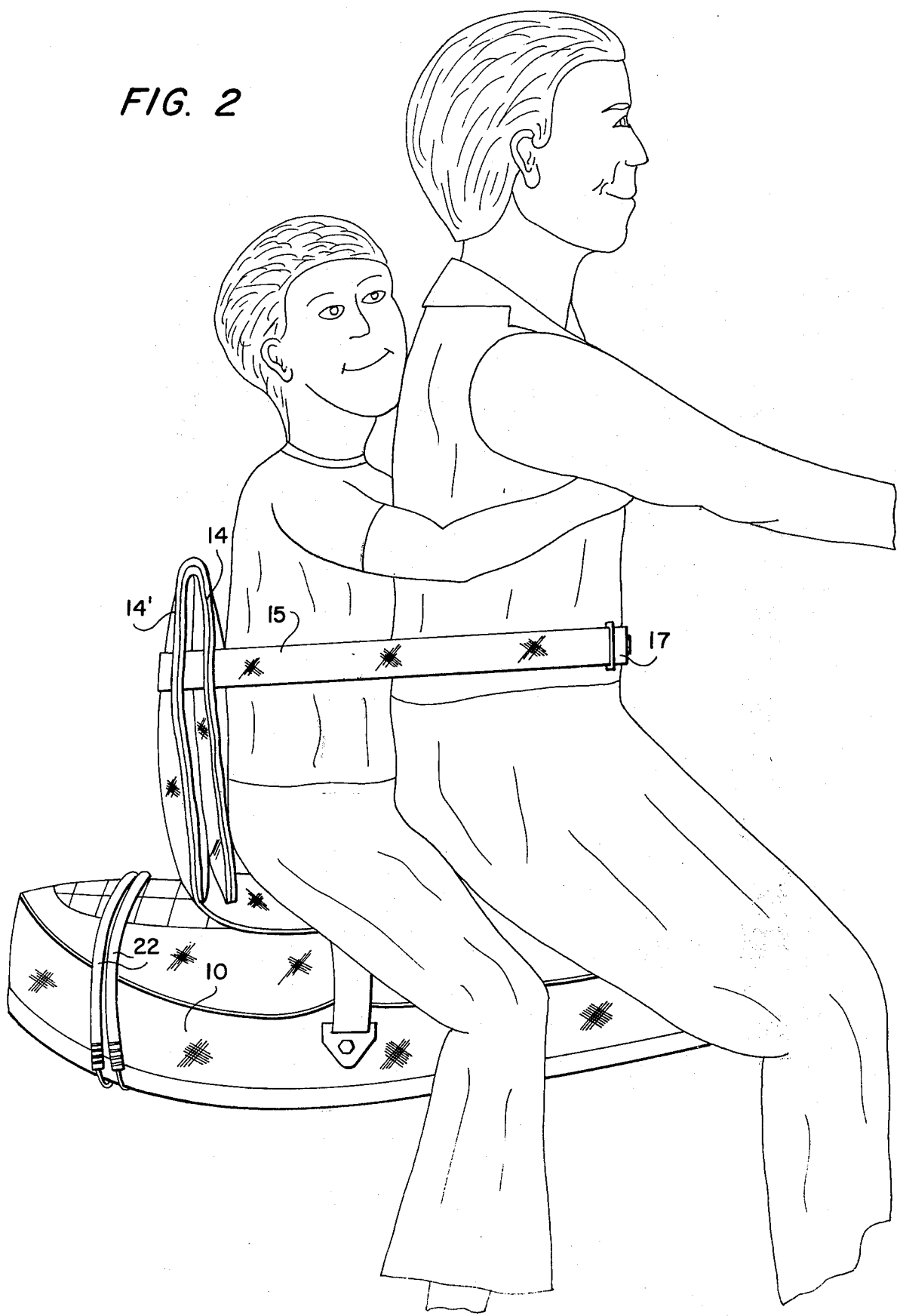
Figure 3:
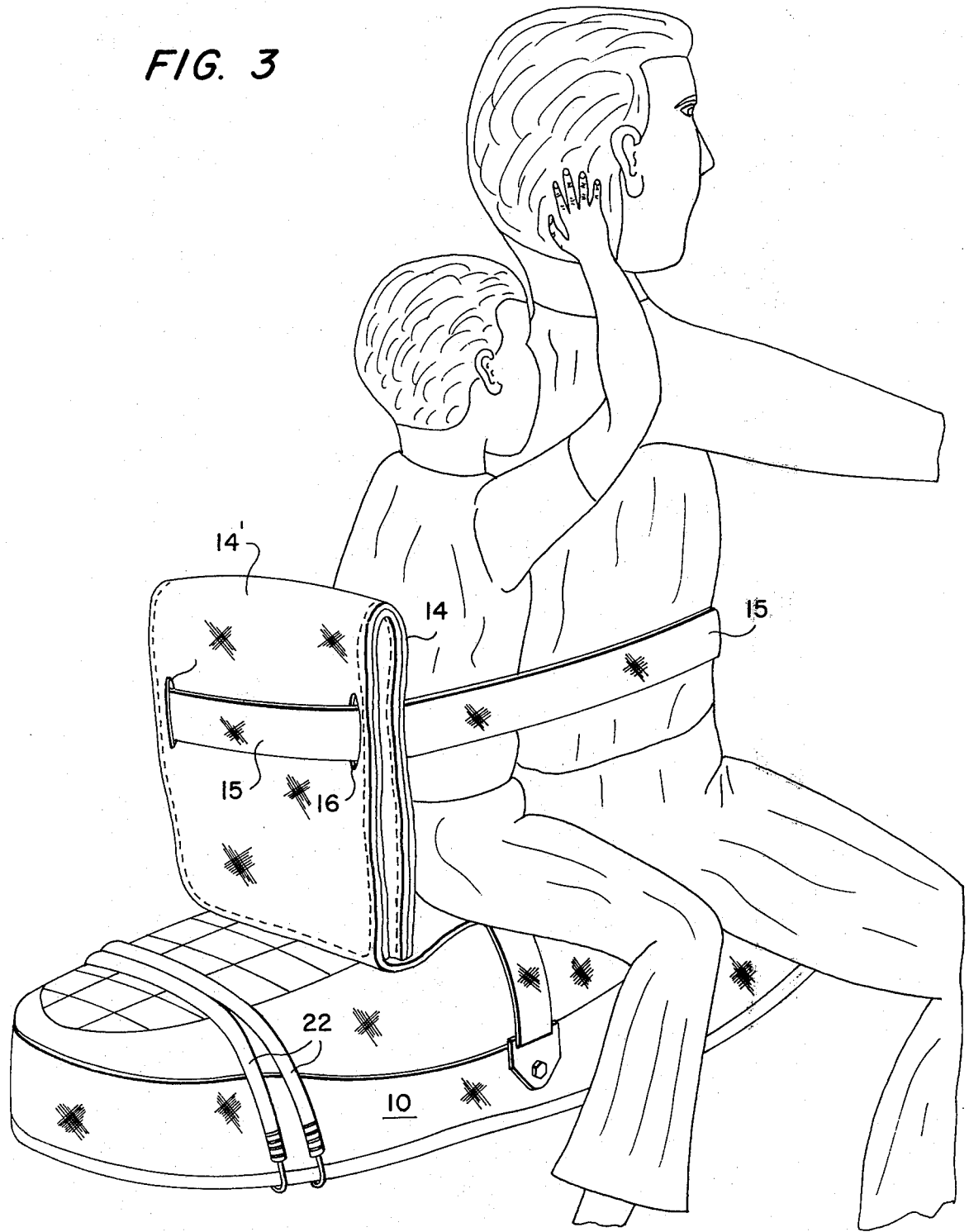

As indicated in FIGS. 2 and 3, the operator sits on the forward end of the extension sheet 11, thus providing additional security against its possible displacement, and a passenger riding behind the operator sits on portion 11' of the extension sheet.

Cushioned portion 14 is folded down against a second cushioned member 14', and belt 15 is inserted through slots 16 in said cushioned members. The belt is then drawn around the bodies of the passenger and the operator and is fastened by means 17 at the front of the operator's body. Fastening may be effected by any desired means, for secure engagement and ready disengagement.

Figure 5:
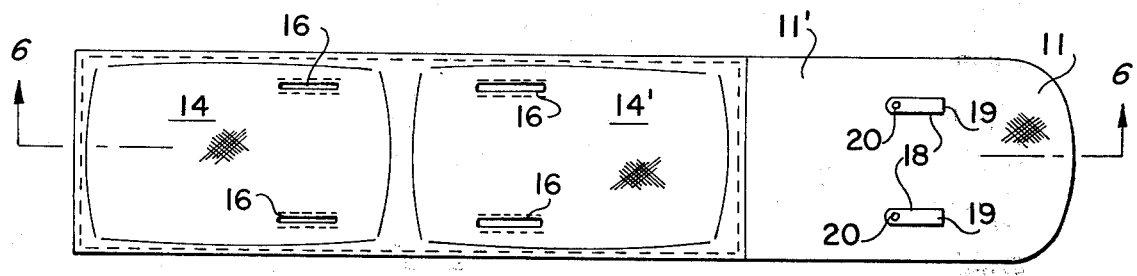
FIG. 5 is a top plan of the invention in extended position.
Figure 6:
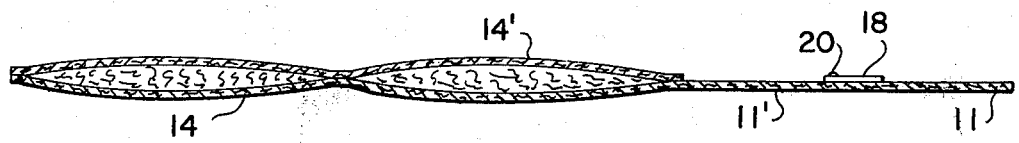
FIG. 6 is a cross-section taken on line 6-6 of FIG. 5.

Minor straps 18 are provided, as shown in FIG. 5, each integrally attached at one end upon the said extension sheet at approximately the mid-point thereof, said minor straps being provided so that they may enclose the transverse strap at opposite sides of the said extension sheet. Each minor strap is integrally attached at one end to the seat member, as at 19, and at the other end 20 there is provided a fastener such as a snap button, by which the minor strap is secured to the seat member and the major, or transverse, strap is secured within said minor straps.

The dual cushions are provided so that, if the passenger is an older child or one having a plump body, or if the operator is stoutly built, the passenger need not be crowded when placed between the operator and the upright cushion member with only the extension sheet beneath him and the operator. In such event, the dual cushions may be unfolded so that the end cushion is at the passenger's back and the passenger sits on the cushion adjacent the extension sheet.

Figure 7:
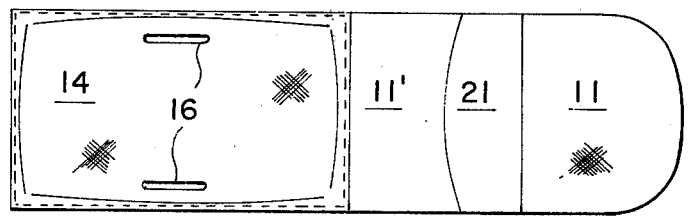
FIG. 7 shows an optional structure in which a single cushion is provided as an alternative to the dual cushions shown in the preceding Figures, and an apron-like sheet is affixed upon the seat member to retain the same securely beneath the transverse strap.

Optionally, it is contemplated that the product of this invention may also be made with a single cushion member. The device as thus shortened is shown in FIG. 7, wherein there is shown in addition an apron-like sheet 21 laterally and integrally attached upon the seat member and extending rearwardly, for the receipt of the transverse strap between said apron and said seat member at the line of attachment thereof.

As a safety factor, this cushion and belt combination is of great value when the passenger is a child, because the thrill of a fast ride may easily distract his attention from the need to "hold on tight," and of course it is impossible for the operator to hold the child behind him and still maintain control of the vehicle.

Figure 4:
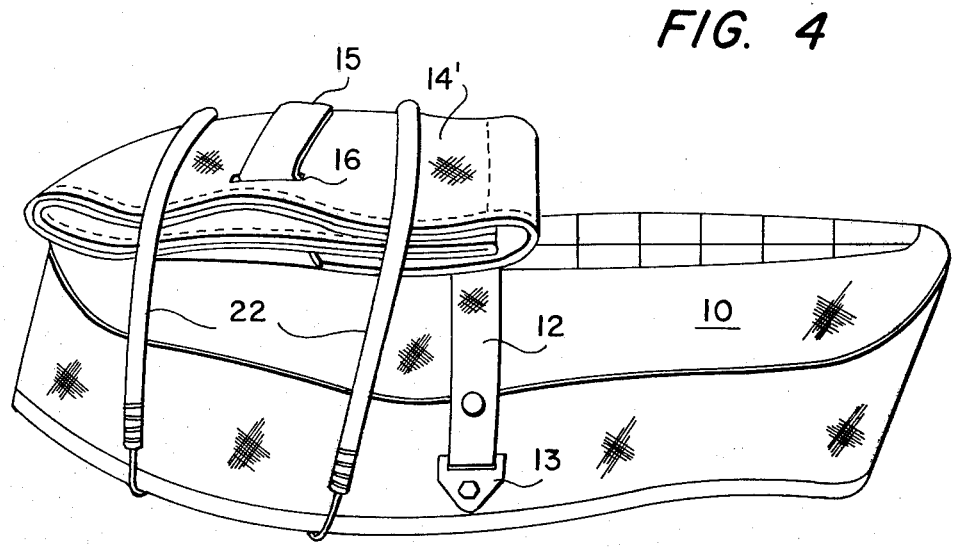

If there is no passenger to be transported on the vehicle, the auxiliary cushion and support device may be stored flat upon the seat as shown in FIG. 4, with resilient cords such as spring actuated members 22, 22 to secure it in place.

While slots 16 are shown in these drawings, it is possible that loops may be integrally attached upon the borders of the cushion members for the passage of the belt therethrough.

Having thus disclosed my invention, I claim:

1. An occupant retention device for an open vehicle having a plural occupant, straddle seat, said device comprising a cushion retained in a substantially upright position adjacent the back of a passenger on said seat; an extension sheet integrally connected to said cushion and lying horizontally on said seat; a transverse strap extending across said seat and over said extension sheet for releasably securing said device to said vehicle; and a belt secured to said cushion for extending around both said passenger and the operator of said vehicle.

2. The invention of claim 1 wherein said extension sheet is secured against rearward slippage by additional securement means overlying said transverse strap for at least a portion of the length of said transverse strap.

3. The invention of claim 2 wherein said additional securement means comprises an apron-like sheet integrally and laterally secured upon said extension sheet, the open border of said apron extending rearwardly and the transverse strap being disposed between said apron and said extension sheet, adjacent the line of attachment of said apron upon said extension sheet.

4. The invention of claim 2 wherein said additional securement means comprises at least one minor strap member disposed in the longitudinal axis of the extension sheet and the vehicle, said minor strap being integrally attached upon the said extension member at one end thereof and having space for the accommodation of said transverse strap beneath said minor strap and between the integrally attached end and the opposite end thereof, said opposite end being detachably fastened upon said extension sheet.

5. The invention of claim 4 wherein said minor strap is integrally attached to said extension sheet at the end thereof nearest the outermost end of said extension sheet, thus providing securement of the transverse strap beneath said minor strap even in the event of detachment of the fastening at the opposite end of said minor strap.

* * * * *